(12) United States Patent
Hackert

(10) Patent No.: US 10,591,339 B2
(45) Date of Patent: Mar. 17, 2020

(54) ACCESSORY WITH SENSORS FOR DETERMINING AN OPERATING STATE, PARTICULARLY MEASURING CUP OR COVER PART FOR A KITCHEN APPLIANCE

(71) Applicant: Vorwerk & Co. Interholding GmbH, Wuppertal (DE)

(72) Inventor: Georg Hackert, Bochum (DE)

(73) Assignee: VORWERK & CO. INTERHOLDING GMBH, Wuppertal (DE)

( * ) Notice: Subject to any disclaimer, the term of this patent is extended or adjusted under 35 U.S.C. 154(b) by 10 days.

(21) Appl. No.: 16/019,868

(22) Filed: Jun. 27, 2018

(65) Prior Publication Data

US 2019/0003869 A1    Jan. 3, 2019

(30) Foreign Application Priority Data

Jun. 29, 2017   (EP) ..................................... 17178575

(51) Int. Cl.
| | |
|---|---|
| *G01F 19/00* | (2006.01) |
| *A47J 36/06* | (2006.01) |
| *A47J 36/32* | (2006.01) |
| *A47J 43/07* | (2006.01) |
| *B01F 15/00* | (2006.01) |
| *B01F 15/04* | (2006.01) |

(52) U.S. Cl.
CPC ............ *G01F 19/002* (2013.01); *A47J 36/06* (2013.01); *A47J 36/321* (2018.08); *A47J 43/0716* (2013.01); *A47J 2043/0733* (2013.01); *A47J 2201/00* (2013.01); *A47J 2203/00* (2013.01); *B01F 15/00422* (2013.01); *B01F 15/00428* (2013.01); *B01F 15/0454* (2013.01); *B01F 15/0491* (2013.01)

(58) Field of Classification Search
CPC ...................................................... G01F 19/002
USPC ........................................................... 73/426
See application file for complete search history.

(56) References Cited

U.S. PATENT DOCUMENTS

| | | | | |
|---|---|---|---|---|
| 2013/0305933 A1* | 11/2013 | Heidrich | ............... | A47J 36/321 99/331 |
| 2016/0166096 A1* | 6/2016 | DiMaria-Ghalili | .... | G06Q 50/24 702/19 |
| 2018/0305091 A1* | 10/2018 | Krafft | ................ | A47G 19/2227 |
| 2019/0142206 A1* | 5/2019 | Yan | .................... | G05D 23/1919 219/505 |

FOREIGN PATENT DOCUMENTS

| | | | | | |
|---|---|---|---|---|---|
| CN | 204423037 U | * | 6/2015 | | |
| CN | 206576495 U | * | 10/2017 | | |
| CN | 208413953 U | * | 1/2019 | | |
| DE | 10 2014 111 216 A1 | | 2/2016 | | |
| DE | 102014111216 A1 | * | 2/2016 | .......... | A47J 43/0716 |
| WO | WO-2010044286 A1 | * | 4/2010 | ............. | A47J 36/38 |
| WO | WO-2014190160 A1 | * | 11/2014 | | |

* cited by examiner

Primary Examiner — Jamel E Williams

(57) ABSTRACT

An accessory for a kitchen appliance, particularly in the form of a measuring cup, for being attached to a cooking vessel, as well as to a correspondingly equipped kitchen appliance, wherein a sensor arrangement is arranged in the accessory and is capable of determining operating states, which are transmitted wirelessly to the kitchen appliance.

9 Claims, 5 Drawing Sheets

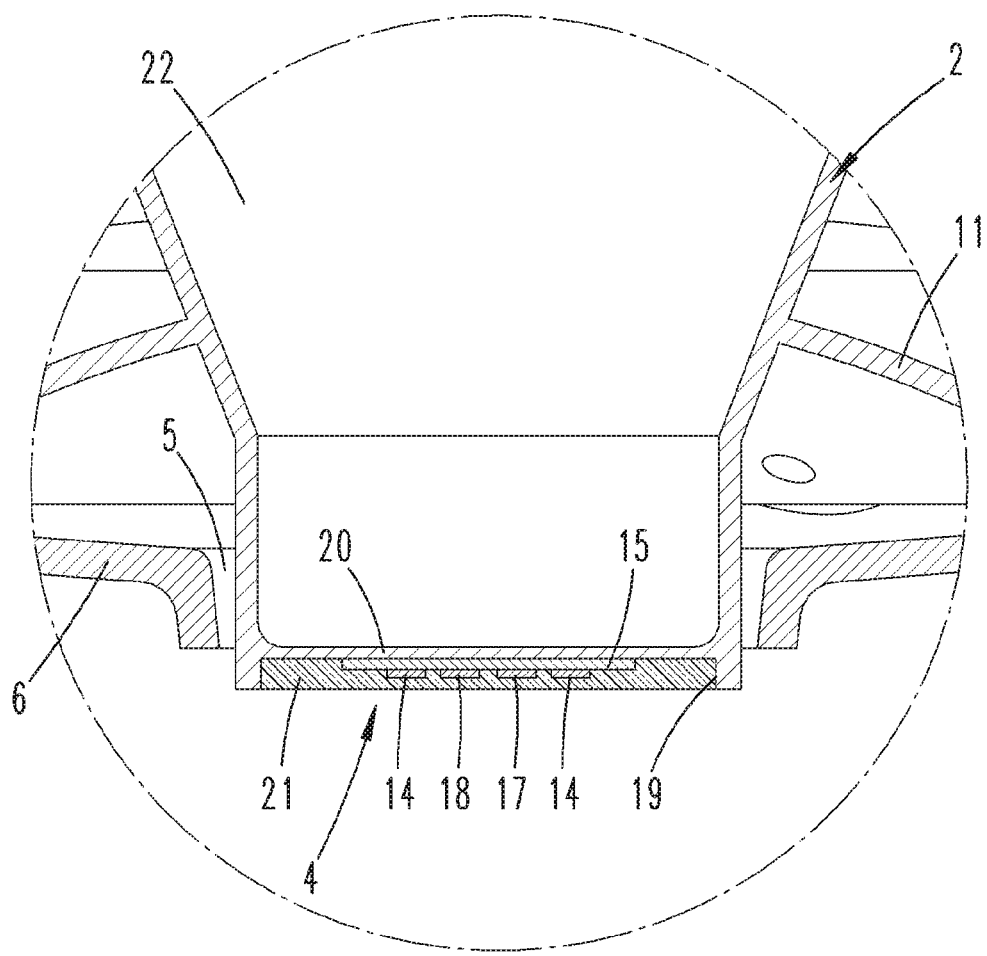

ACCESSORY WITH SENSORS FOR DETERMINING AN OPERATING STATE, PARTICULARLY MEASURING CUP OR COVER PART FOR A KITCHEN APPLIANCE

CROSS REFERENCE TO RELATED APPLICATIONS

Applicant claims priority under 35 U.S.C. § 119 of European Application No. 17178575.1, filed Jun. 29, 2017, the disclosure of which is incorporated by reference.

BACKGROUND OF THE INVENTION

1. Field of the Invention

The invention pertains to an accessory, particularly a measuring cup or a cover part for a kitchen appliance, for being attached to a cooking vessel.

The invention furthermore pertains to a kitchen appliance with such an accessory.

2. Description of the Related Art

A measuring cup, which can be attached to a cover that closes a cooking vessel of a kitchen appliance in order to close an opening in the cover, is known from DE 10 2014 111 216 A1. The measuring cup has a bottom and a cavity that is arranged above the bottom and can be used as measuring volume. A collar in the form of a screen covers the opening such it the accessory also acts as a splash guard.

Moreover, sensors for heat detection, image evaluation, distance measurements or the like are known from the prior art. In addition, there are scanners capable of detecting RFID transponders and reading out their identification number. It is also known to transmit data wirelessly via Bluetooth. Furthermore, it has already been proposed to measure temperatures of food to be cooked within a cooking vessel and to transmit the measured values wirelessly to a mobile terminal.

SUMMARY OF THE INVENTION

The invention is based on the objective of advantageously enhancing an accessory for a kitchen appliance, particularly a functional part such as a cover part and/or measuring cup, with respect to its use.

This objective is attained with the invention specified in the claims.

According to the invention, it is proposed that the accessory features a sensor arrangement capable of determining an operating state, particularly inside the cooking vessel. This operating state may be a temperature, a filling height of the food to be cooked in the cooking vessel, the presence of a drop-in container inserted into the cooking vessel, the presence of an agitator or a mixer attachment attached to the agitator, the weight of a mass arranged in the cavity of the measuring cup or the rotational speed of a knife arrangement. It is particularly proposed that the accessory is realized in the form of a cover part or splash guard for closing an opening in a cover attached to the cooking vessel. The sensor arrangement particularly is also capable of determining if the cover part closes the opening. The sensor arrangement is preferably arranged in a bottom of the accessory in the form of a measuring cup, wherein it is particularly proposed that the bottom protrudes into the cooking vessel through a cover opening, and wherein the sensor arrangement may comprise sensors in the form of a camera, an infrared sensor, an ultrasonic distance meter, a thermometer, an IR sensor or the like. According to the invention, an accessory performing a mechanical function on a kitchen appliance is realized with supplementary sensor means, which in a manner of speaking provide the accessory with its own intelligence. The sensors of the sensor arrangement enable the accessory to directly determine states inside or outside the cooking vessel. The states determined by the sensor arrangement are transmitted to control electronics of the kitchen appliance in the form of data. To this end, the accessory features a sensor and the kitchen appliance features a receiver. The wireless data transmission may be realized via Bluetooth or another suitable protocol. In this way, the user of the kitchen appliance can be warned if a component required for the preparation of a meal such as an agitator, a mixer attachment or a drop-in container is missing. The user can also be warned about an excessively high filling level inside the cooking vessel. The user can furthermore be alerted if the accessory itself does not perform its intended mechanical function, e.g. its function of closing a cover opening in the form of a cover part. It is proposed that the sensor arrangement operates autarkic with respect to its energy supply and therefore features an accumulator. Means for charging the accumulator wirelessly may be provided. For example, an induction coil acting as primary coil of a transformer may be arranged in the cover. A secondary coil may be arranged in the accessory and form a transformer together with the primary coil in the intended position of the accessory on the kitchen appliance such that energy can be transmitted to the accessory. The electronic components are installed in the accessory in a waterproof fashion. For example, the bottom of the accessory in the form of a measuring cup may for this purpose feature a cavity, into which the electronic components are inserted. The cavity can then be sealed with a suitable waterproofing compound such that the accessory can be cleaned in a dishwasher. It is furthermore proposed that the data acquired by the accessory is used by a control circuit of the kitchen appliance for influencing the operating state of the kitchen appliance, e.g. for changing a temperature or for changing a rotational speed of the agitator. It would furthermore be conceivable that the electronic control circuit in the accessory features a program-controlled microcontroller, which is capable of reacting to measured values in a qualified or quantified fashion. The inventive design makes it possible to improve the cooking result and to prevent operating errors. An incorrect setup of the kitchen appliance can be detected if it operates in accordance with a predefined program, which requires the presence, e.g., of a mixer attachment or a drop-in container.

BRIEF DESCRIPTION OF THE DRAWINGS

An exemplary embodiment of the invention is described in greater detail below with reference to the attached drawings. In these drawings:

FIG. 3*a* shows the enlarged detail IIIa of FIG. 3.

DETAILED DESCRIPTION OF THE PREFERRED EMBODIMENTS

Figure 1:
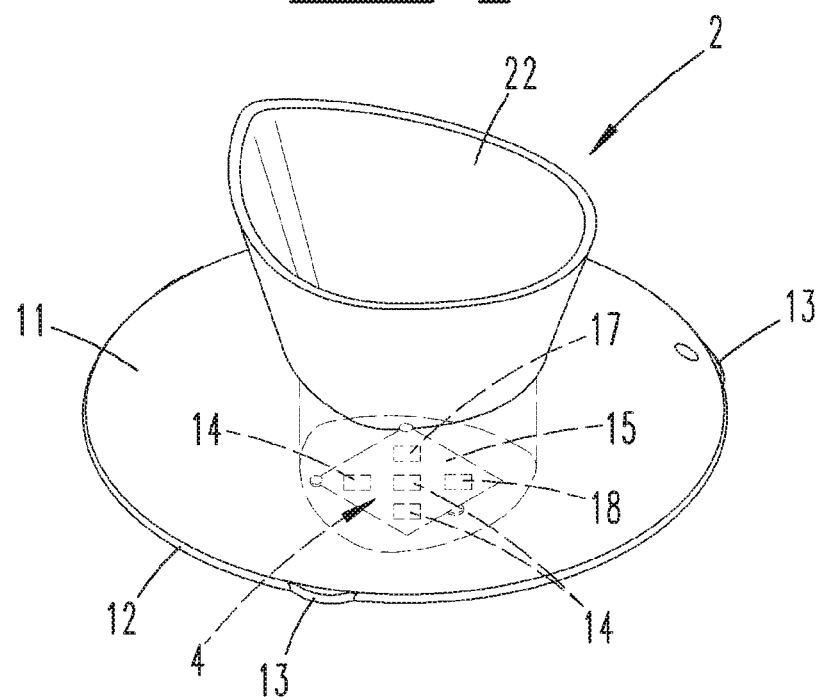
FIG. 1 shows an accessory for a kitchen appliance in the form of a measuring cup or cover part with splash guard L.
Figure 2:
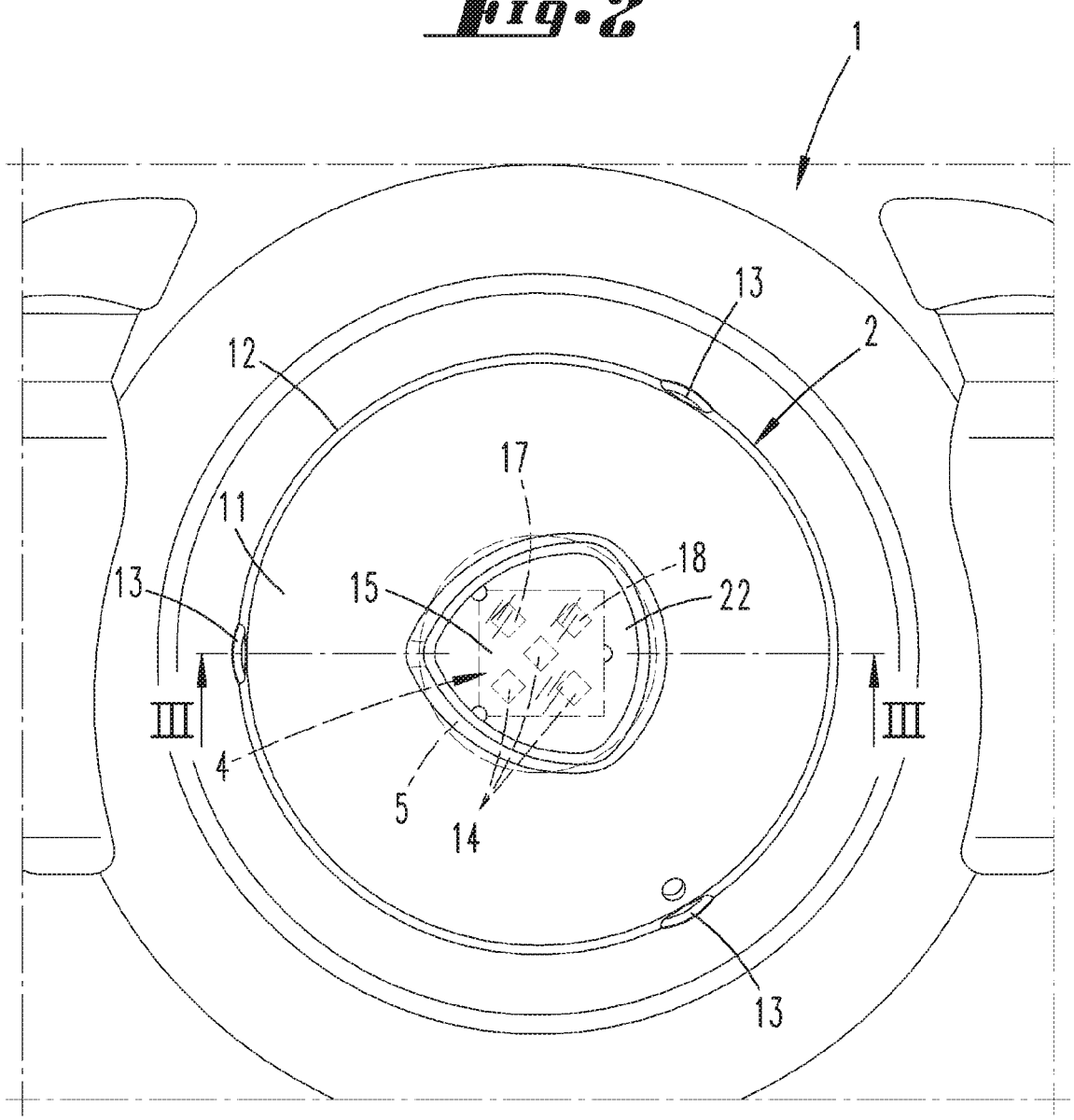
FIG. 2 shows a top view of the kitchen appliance.

In the exemplary embodiment, the accessory 2 forms a combined measuring cup/cover part, which can be attached to a cover 6 that closes the cooking vessel 3. An edge region in the form of a screen 11 is provided and can overlap the edge of the opening 5 in the cover 6. The screen features an edge 12 with spacer elements 13 protruding therefrom, wherein said spacer elements rest on the cover surface in order to thereby space apart the edge 12 from the cover surface.

The screen 11 encloses a hollow body that is open on the top and forms a cavity 22 with a bottom 20. The bottom 20 may be arranged on a lower section of the part of the measuring cup 2, which forms the cavity 22 and protrudes into the cooking vessel 3 through the opening 5. The cavity 22 forms a measuring volume.

The bottom 20 features a cavity 19, in which a sensor arrangement 4 is arranged. This sensor arrangement consists of a circuit board 15 that carries at least one sensor 14. The circuit board may furthermore carry a transmitter 17 that is capable of transmitting data to a receiver 16 arranged in the kitchen appliance 1. The data received by the receiver 16 is forwarded to an electronic control circuit of the kitchen appliance.

Figure 3:
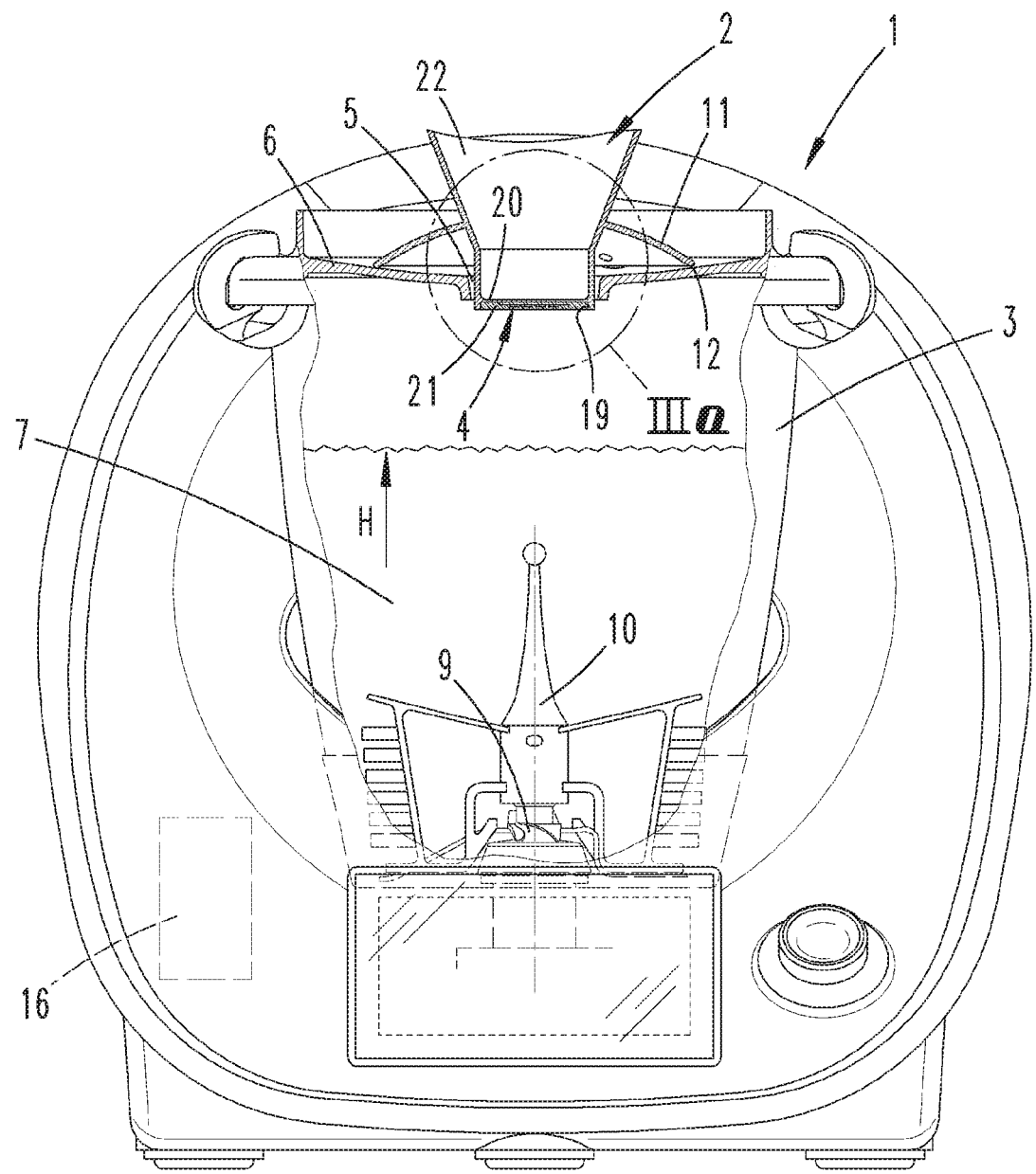
FIG. 3 shows a section through the accessory 2 along the line III-III, however, while it is attached to the cooking vessel 3 of a kitchen appliance 1.
Figure 4:
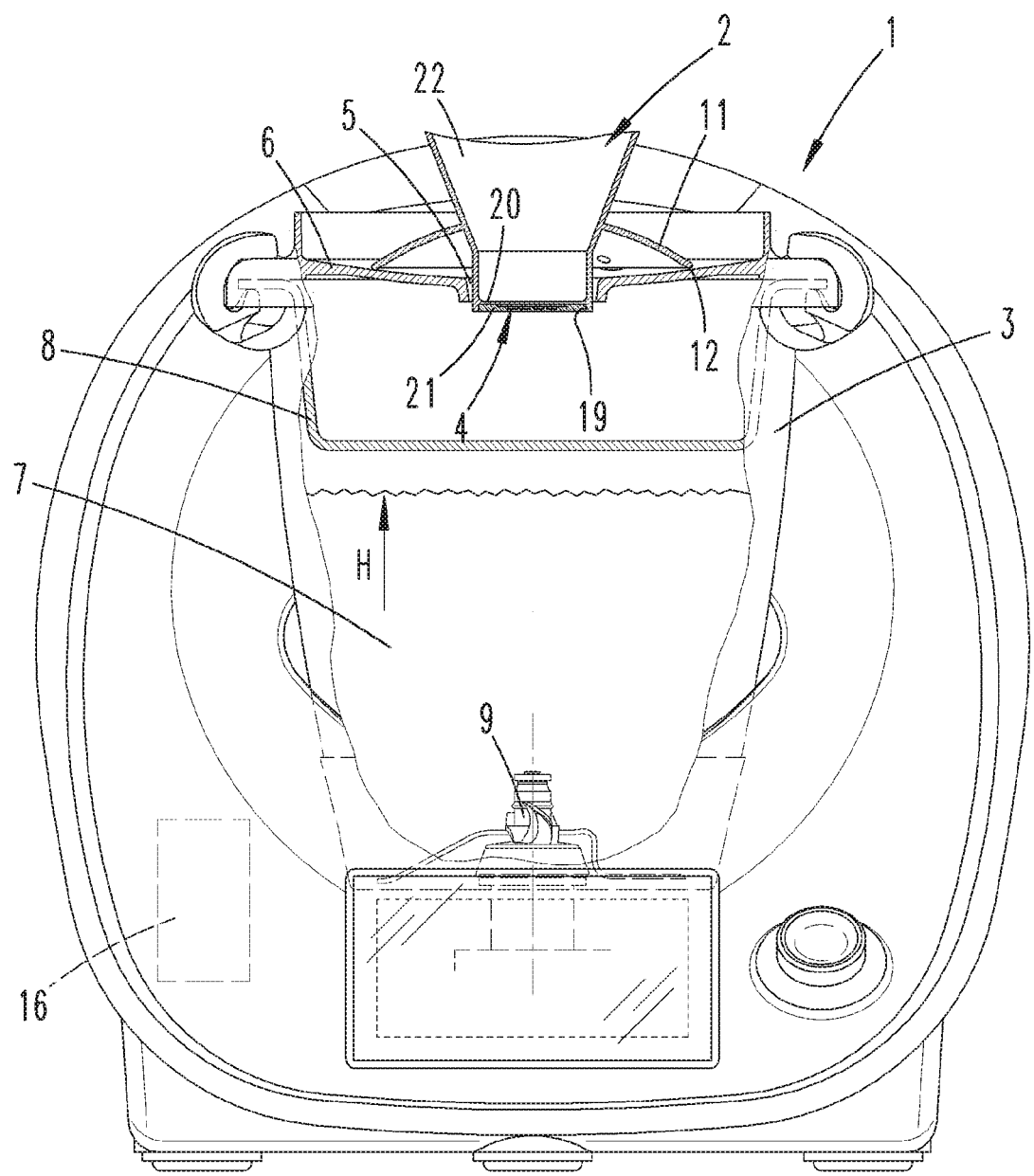
FIG. 4 shows a representation according to FIG. 1, however, with a different setup of the cooking vessel 3.

The sensors 14 may comprise a distance sensor, e.g. an ultrasonic sensor, which is capable of determining the filling level H of a food to be cooked inside the cooking vessel 3. The sensors 14 may also comprise a sensor that is capable of determining the temperature of the food to be cooked in the cooking vessel 3, e.g. an IR sensor or a thermometer. If the sensors 14 furthermore comprise an imaging sensor, e.g. a camera capable of detecting equipment located inside the cooking vessel, a sensor 14 can therefore detect, e.g., if a mixer attachment 10 illustrated in FIG. 3 is attached to an agitator 9 or if the agitator 9 is installed. One of the sensors 14 can also detect if a drop-in container 8 of the type illustrated in FIG. 4 has been inserted into the cooking vessel 3. It is furthermore possible to detect if the accessory 2 assumes its intended position as cover part 2 of the opening 5 in the cover 6 with a sensor 14.

The measured values of the operating states are transmitted wirelessly to the kitchen appliance, e.g. via a Bluetooth protocol, wherein the kitchen appliance can show error messages or the like on a display. The data acquired by the sensor arrangement and transmitted to the kitchen appliance 1 can furthermore be used for influencing the control of the kitchen appliance 1, wherein this is particularly advantageous when the kitchen appliance 1 carries out an automated cooking process according to a program.

It would furthermore be conceivable that the accessory 2 in the form of a measuring cup features a weight sensor capable of determining a mass, e.g. of an ingredient to be added, which is filled into the measuring volume 22. The data acquired by the weight sensor is transmitted wirelessly to the control electronics of the kitchen appliance and can be numerically shown on a display.

The accessory makes it possible to detect the presence of accessories of the kitchen appliance 1 in a contactless fashion. A contactless measurement of state variables of the food to be cooked, e.g. its temperature, can also be realized. The measured state variables of the food to be cooked can be used as control parameters for a program-controlled recipe. An incorrect setup or operating error can furthermore be detected.

Since all electronic components are encapsulated in the plastic accessory 2 in a waterproof fashion, the accessory 2 can be cleaned in a dishwasher.

An accumulator 18 for the energy supply and energy storage may be provided within the accessory 2. Means for charging the accumulator 18 wirelessly, e.g., by means of cooperating coils, may furthermore be provided. A primary coil may be arranged, e.g., in the cover 6 and induce a voltage for charging the accumulator 18 in a secondary coil of the measuring cup 2.

In the setup of the cooking vessel 3 illustrated in FIG. 3, it can be detected, for example, if a mixer attachment 10 is attached to an agitator 9. In the setup illustrated in FIG. 4, it can be checked, for example, if a drop-in container 8 is inserted.

LIST OF REFERENCE SYMBOLS

1 Kitchen appliance
2 Accessory
3 Cooking vessel
4 Sensor arrangement
5 Opening
6 Cover
7 Food to be cooked
8 Drop-in container
9 Agitator
10 Mixer attachment
11 Screen
12 Edge
13 Spacer element
14 Sensor
15 Circuit board
16 Receiver
17 Transmitter
18 Accumulator
19 Cavity
20 Bottom
21 Sealing compound
22 Measuring volume

What is claimed is:

1. An accessory in the form of a measuring cup that is configured for being attached to a cooking vessel of a kitchen appliance, wherein the measuring cup has a measuring volume with a bottom and a sensor arrangement, wherein the sensor arrangement comprises at least one sensor capable of detecting a distance or the presence of an object within a detection range of the sensor.

2. The accessory according to claim 1, wherein the sensor arrangement is arranged in the bottom.

3. The accessory according to claim 1, further comprising a transmitter for the wireless transmission of data.

4. The accessory according to claim 1, wherein the sensor arrangement further comprises at least one sensor capable of detecting a temperature and or a weight.

5. The accessory according to claim 1, wherein the at least one sensor is an imaging sensor, an RFID read sensor, an infrared sensor, a or an ultrasonic sensor.

6. The accessory according to claim 1, wherein the accessory features an autarkic energy supply, e.g. in the form of an accumulator.

7. A kitchen appliance comprising a cooking vessel and an accessory in the form of a measuring cup that is configured for being attached to the cooking vessel, wherein the measuring cup has a measuring volume and a bottom and features a sensor arrangement configured for determining at least one operating state in the cooking vessel, wherein the sensor arrangement comprises at least one sensor capable of detecting a position of the accessory, in which the accessory covers an opening of the cooking vessel, or a sensor capable of detecting a filling level, the presence of an agitator, the presence of a mixer attachment, the presence of a drop-in container in the cooking vessel and/or the presence of the accessory.

8. The kitchen appliance according to claim 7, wherein the sensor arrangement further comprises a sensor that is capable of detecting a temperature of food to be cooked in the cooking vessel.

9. The kitchen appliance according to claim 7, wherein the accessory features an autarkic energy supply in the form of an accumulator, wherein the accumulator is charged in a functional position of the accessory on the cooking vessel, and/or wherein the accessory features a transmitter for wireless transmission of data characterizing a determined operating state to a receiver of the kitchen appliance.

\* \* \* \* \*